US007649626B2

(12) United States Patent
Harvey et al.

(10) Patent No.: US 7,649,626 B2
(45) Date of Patent: Jan. 19, 2010

(54) IMAGING SPECTROMETER

(75) Inventors: Andrew Robert Harvey, Edinburgh (GB); David William Fletcher-Holmes, Edinburgh (GB)

(73) Assignee: Qinetiq Limited (GB)

( * ) Notice: Subject to any disclaimer, the term of this patent is extended or adjusted under 35 U.S.C. 154(b) by 504 days.

(21) Appl. No.: 10/511,502

(22) PCT Filed: Apr. 15, 2003

(86) PCT No.: PCT/GB03/01630

§ 371 (c)(1),
(2), (4) Date: Apr. 4, 2005

(87) PCT Pub. No.: WO03/089890

PCT Pub. Date: Oct. 30, 2003

(65) Prior Publication Data

US 2005/0174573 A1  Aug. 11, 2005

(30) Foreign Application Priority Data

Apr. 18, 2002  (GB) .................... 0208869.8

(51) Int. Cl.
*G01J 3/28* (2006.01)
(52) U.S. Cl. .................................... 356/326
(58) Field of Classification Search ................ 356/300, 356/326, 328, 327, 416, 419; 250/226; 348/337–338; 359/634
See application file for complete search history.

(56) References Cited

U.S. PATENT DOCUMENTS

| 3,497,283 A | 2/1970 | Law |
| 3,588,224 A | 6/1971 | Pritchard |
| 3,932,027 A | 1/1976 | Cook et al. |
| 4,575,193 A * | 3/1986 | Greivenkamp, Jr. ......... 359/495 |
| 5,781,293 A * | 7/1998 | Padgett et al. ............... 356/453 |
| 5,953,083 A | 9/1999 | Sharp |
| 5,982,497 A * | 11/1999 | Hopkins ...................... 356/419 |
| 2002/0030811 A1* | 3/2002 | Schindler .................... 356/318 |

FOREIGN PATENT DOCUMENTS

| DE | 38 18278 | 2/1989 |
| EP | 0436 924 | 7/1991 |
| WO | WO 00/70376 | 11/2000 |

OTHER PUBLICATIONS

Volin et al. "Portable Computed Tomography Imaging Spectrometer", SPIE vol. 2891, pp. 224-230.
Descour et al., "Computed-Tomography Imaging Spectrometer: Experimental Calibration and Reconstruction Results", Applied Optics, pp. 4817-4826 (1995).
International Search Report from the European Patent Office for Application No. PCT/GB03/01630.

* cited by examiner

*Primary Examiner*—Kara E Geisel
(74) *Attorney, Agent, or Firm*—McDonnell Boehnen Hulbert & Berghoff LLP

(57) ABSTRACT

An imaging spectrometer is disclosed that comprises imaging means for dividing a received image into two or more spatially separated images and means for detecting each spectral image, and is characterized in that the imaging means comprises at least one polarizing beam splitter. The polarizing beam splitter may be a Wollaston prism. In one embodiment of the invention, the imaging means comprises image replication means to produce two or more spatially separated images, and one or more filter elements such as dichroic filters which act to alter the spectral characteristics of one or more of the spatially separated images. In a further embodiment of the invention the imaging means comprises one or more spectral replication means arranged in optical series, each spectral replication means comprising an optical retardation element and a polarizing beam splitter.

17 Claims, 5 Drawing Sheets

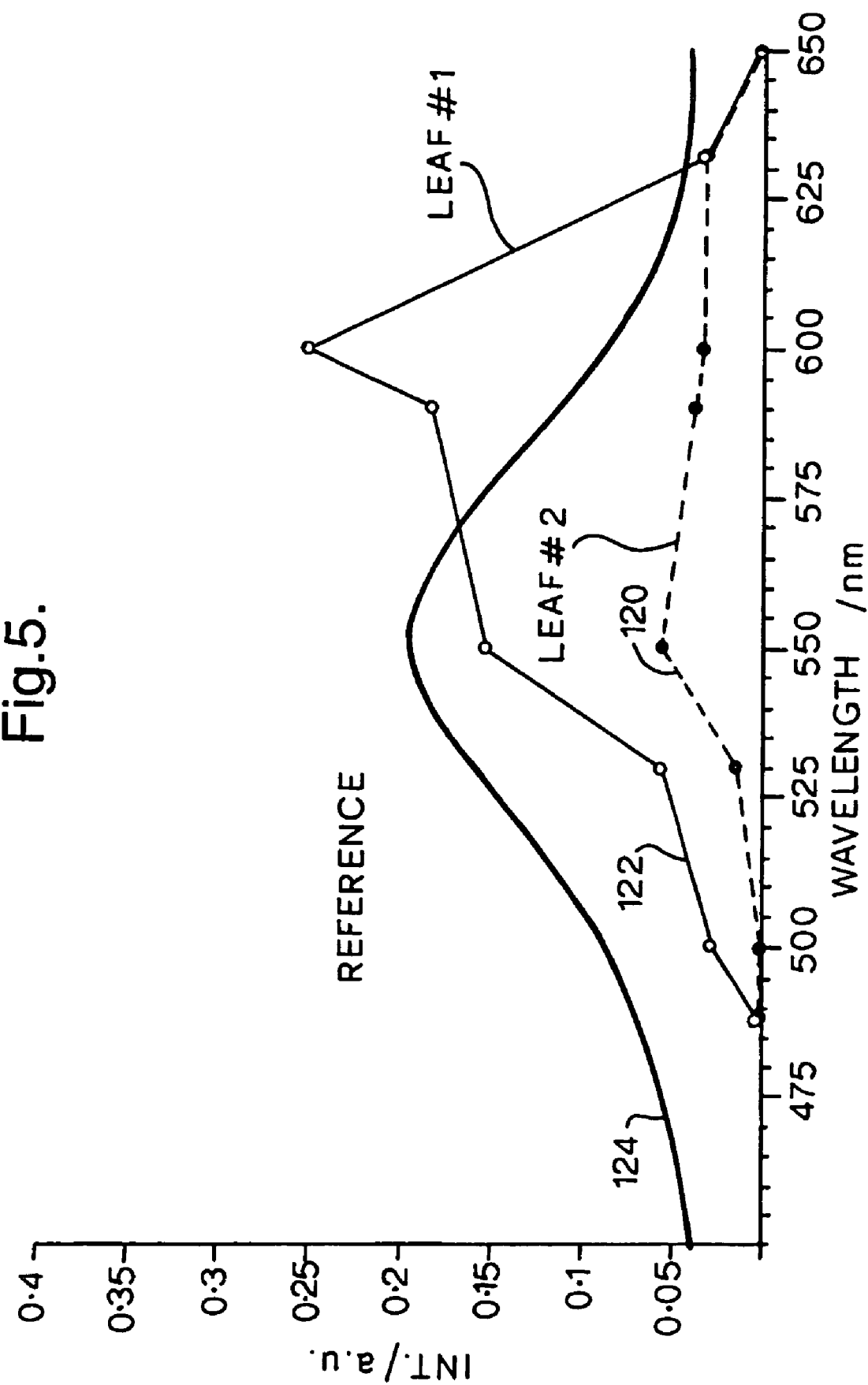

IMAGING SPECTROMETER

Figure 1:
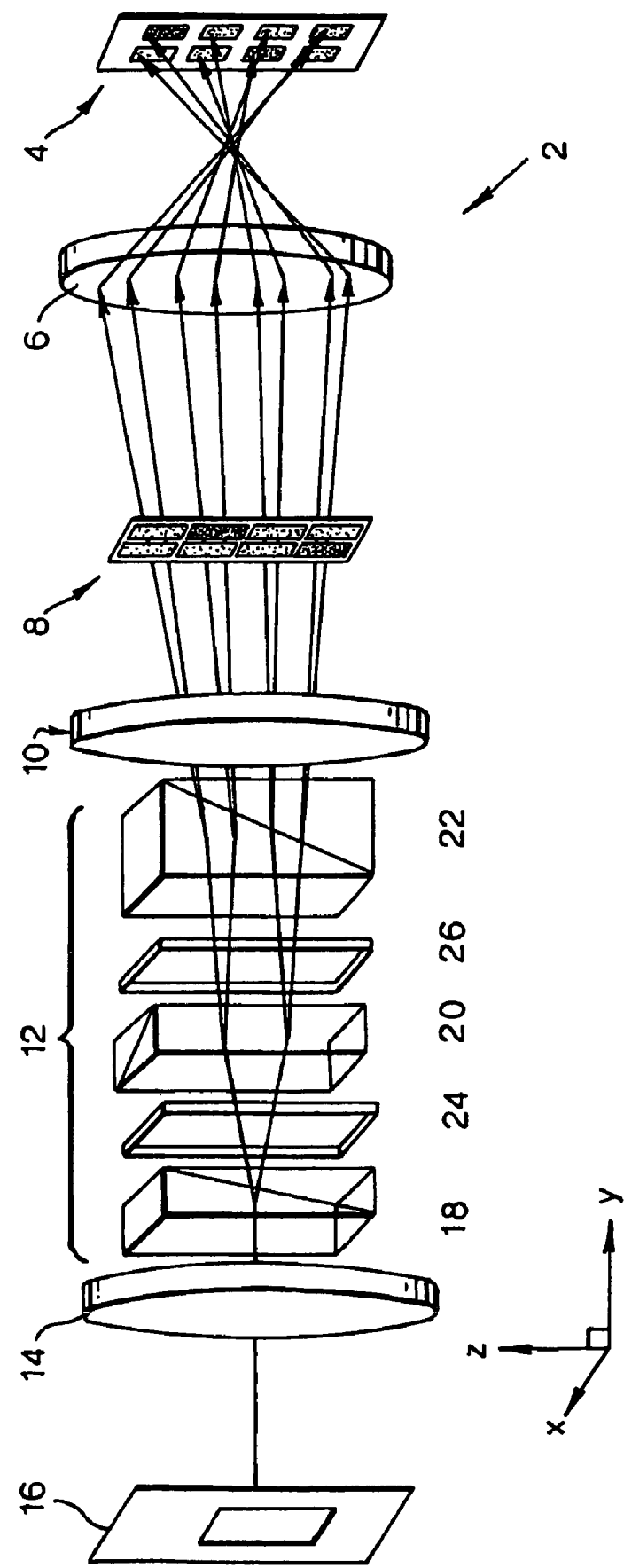

This invention relates to an imaging spectrometer, and in particular to a non-temporally multiplexed image replicating imaging spectrometer.

Imaging spectrometers are used to acquire two dimensional images of a scene. Optical predetector processing, sometimes combined with electronic post-detector processing of the acquired image, produces a spectral data cube that consists of a single scene area imaged in multiple spectral bands.

An imaging spectrometer may acquire spectral images from the scene in either a temporally multiplexed or a non-multiplexed manner. A temporally multiplexed imaging spectrometer sequentially acquires a series of spectral images from a scene; for example a number of filters are sequentially inserted in to the optical path of a camera imaging system. Temporally non-multiplexed imaging spectrometers operate by simultaneously acquiring a number of two-dimensional spectral images. In other words, non-multiplexed imaging spectrometers provide "snap-shop" spectral imaging. Non-multiplexed systems are desirable in applications where real time operation is important, such as medical imaging and military surveillance from moving platforms.

Temporally non-multiplexed spectral imagers based on traditional RGB colour cameras are known; such cameras can be categorised as "three chip" or "single chip" systems. In "three chip" systems, for example U.S. Pat. No. 3,932,027, the image is split into three separate sub-images using non-polarising dichroic beam splitters and each sub-image is directed to a separate detector. However, these systems require complex and relatively expensive optical components to provide the replicated images. In "single chip" cameras, non-polarising dichroic filters placed on the chip itself enable trichromatic sub-images of the scene to be constructed. Disadvantages of such devices include significant variations in spectral responses for filters across the array and a low optical efficiency.

Another type of non-multiplexed imaging spectrometer that provides improved spectral resolution is a tomographic imaging spectrometer; see, for example, Descour et al., App. Opt. 34, pp 4817 (1995) or Volin et al., S.P.I.E. 2819, pp 224-230. The technique employs a diffractive optical element to produce an array of spectrally dispersed diffraction orders at the detector that are decomposed into spectral images using computer tomographic techniques.

Tomographic techniques have several disadvantages. For example, the computational load is rather high which restricts its use in real-time imaging applications. The decomposition of the overlapping orders increases the noise level and system calibration cannot be perfectly achieved resulting in a noise performance that is significantly worse than that due to detector and shot-noise contributions. Furthermore, the ratio of the number image pixels in the spectral data cube to the number of data points recorded can be as small as 30% resulting in an inefficient use of the recorded data and increased noise levels.

According to a first aspect of the present invention an imaging spectrometer comprises imaging means for dividing a received image into two or more spatially separated spectral images, and means for detecting each spectral image, and is characterised in that the imaging means comprises at least one polarising beam splitter.

The use of one or more polarising beam splitters in the imaging means has the advantage of providing lower levels of optical loss than prior art devices and/or requires lower complexity, hence cheaper, optical imaging apparatus. The term spectral image is herein taken to mean an image that has spectral characteristics that are a subset of the spectral characteristics of the image received by the imaging means.

Advantageously, the imaging means comprises image replication means to produce two or more spatially separated images, and one or more filter elements which act to alter the spectral characteristics of one or more of the spatially separated images.

In other words, the imaging means comprises an image replication means to split the image it receives in to two or more replicated images. Filter elements are then provided to spectrally filter one or more of the replicated images; i.e. the filter element passes light within a certain waveband thereby producing a spectral image.

Conveniently, the filter elements are dichroic filter elements. Dichroic filter elements are readily available to those skilled in the art, and provide a low cost waveband filter.

The filter elements may be placed in the optical path of one or some of the replicated images produced by the image replication means. For example, the filter elements may be located in the vicinity of the means for detecting each spectral image, or at a conjugate plane (i.e. at an intermediate focal plane within the imaging means) thereof.

Preferably, the spectrometer has image replication means that comprise two or more polarising beam splitters and additionally comprises optical retardation elements located between the polarising beam splitters.

The use of two or more polarising beams splitters (i.e. if four or more replicated images are required) makes it necessary to insert retardation elements between adjacent polarising beam splitters. In other words, N polarising beam splitters interspersed with N−1 retarders produce $2^N$ replicated images. The retarder(s) may, for example, be quarter wave or half wave plates. It is preferable, although by no means necessary, for the retardation elements to be approximately achromatic. The fast axes of these retarders are typically placed at 45° to the axes of the polarising beam splitters to ensure an even distribution of intensity between the spatially separated spectral images.

Conveniently, the spectrometer additionally comprises an input optical retardation element to define the input polarisation state of the image received by the imaging means. The optical retardation imparted by the input optical retardation element may, advantageously, be variable. One way of varying the optical retardation imparted by the input optical retardation element is to alter its orientation, for example by rotation.

The spectrometer of the present invention is inherently capable of simultaneously recording spectral images in orthogonal polarisation states; the first polarising beam splitter dividing light from the scene in to its two orthogonal polarisation components. Control of the polarisation state of the image received by the image replication means, using the input optical retardation elements, allows more detailed polarimetric information to be extracted. For example, two sets of spectral images recorded using two received images having different polarisation states would allow spectral images to be recorded in two orthogonal polarisation states; four spectral images with appropriate beam splitting would enable full Stokes parameter characterisation of images.

Advantageously, the imaging means comprises one or more spectral replication means arranged in optical series, each spectral replication means comprising an optical retardation element and a polarising beam splitter.

An advantage of such an imaging means is that very low levels of optical loss are introduced; the input light is simply divided into the output spectral images without any rejection of light. It is the wavelength dependence of the retardation element(s) in combination with the polarisation analysing function of the beamsplitter(s) that spectrally filters each replicated image according to its propagation route through the device. In general, a sequence of N polarising beams splitters and N retarders produce $2^N$ replicated images.

Conveniently, one or more of the optical retardation elements provides a wavelength dependent polarisation change. Advantageously, the thickness of the one or more optical retardation elements is chosen to define the spectral properties of each spectral image within the spectral data cube.

As described in more detail below, the spectral properties of each spatially separated spectral image are defined by the overall optical properties of the imaging means. However, selection of the retarder thickness provides a convenient way to tune the spectral properties of the spectral images.

Conveniently, four or more spatially separated spectral images are produced by the spectrometer and each spectral image is advantageously composed of radiation within a different waveband. For example, each spectral image could be composed of radiation from wavebands distributed over a wavelength range of interest.

As each spectral replication means doubles the number of images within the spectrometer without any significant optical losses, a number (e.g. 4, 8, 16, 32, 64 etc) of spectral images can be provided. This degree of image replication can not be readily obtained using prior art colour cameras; for example filters of the required spectral resolution would be difficult to fabricate for single chip systems, and multiple chip systems would require additional optical components for each of the replicated images.

Advantageously, the means for detecting each replicated image comprises a detector array, each replicated image being directed to a separate portion of the detector array. Alternatively, the means for detecting each replicated image comprises two or more detector arrays and conveniently a separate detector array may be provided to detect each replicated image.

The means for detecting each replicated image may be a single detector array, for example a CCD detector, or may comprise multiple adjacent detectors. The form of the detector array will depend on the spatial resolution required from the spectrometer, and as the number of replicated spectral images is increased the number of pixels per image for a given detector will obviously be reduced accordingly. CCD detectors are currently known that have up to 4096×4096 pixels. For high data rates, the use of several detector arrays is preferred as they will typically provide a greater space-bandwidth product than a single detector array. The number of voxels in the output spectral data cube in an imaging spectrometer of the present invention can, in principle, be equal to the number of pixels in the detector array. This is compared to around 30% efficiency for prior art computed tomographic imaging spectrometry.

Preferably, the polarising beam splitter is a Wollaston prism. A Wollaston prism allows multiple spectral images to be formed on a single detector.

Conveniently, the optical components of the image replication means are formed as a single compound optical element. For example, the beam splitter(s) and retarder(s) could be cemented together to reduce optical losses associated with Fresnel reflection.

Advantageously, the spectrometer additionally comprising a field stop, the field stop limiting the field of view of the image received by the image replication means. The field stop limits the field of view, thereby preventing overlap of adjacent spatially separated spectral images.

Furthermore, a spectral filter for separating an image into a plurality of spectral images could be provided that comprises one or more spectral replication means arranged in optical series wherein each spectral replication means comprises an optical retardation element and a polarising beam splitter, wherein each image incident on a spectral replication means is split into two spatially separated output images having different spectral properties.

An advantage of such a spectral filter is the ability to divide radiation into two or more spectral components with minimal levels of optical loss.

Figure 2:
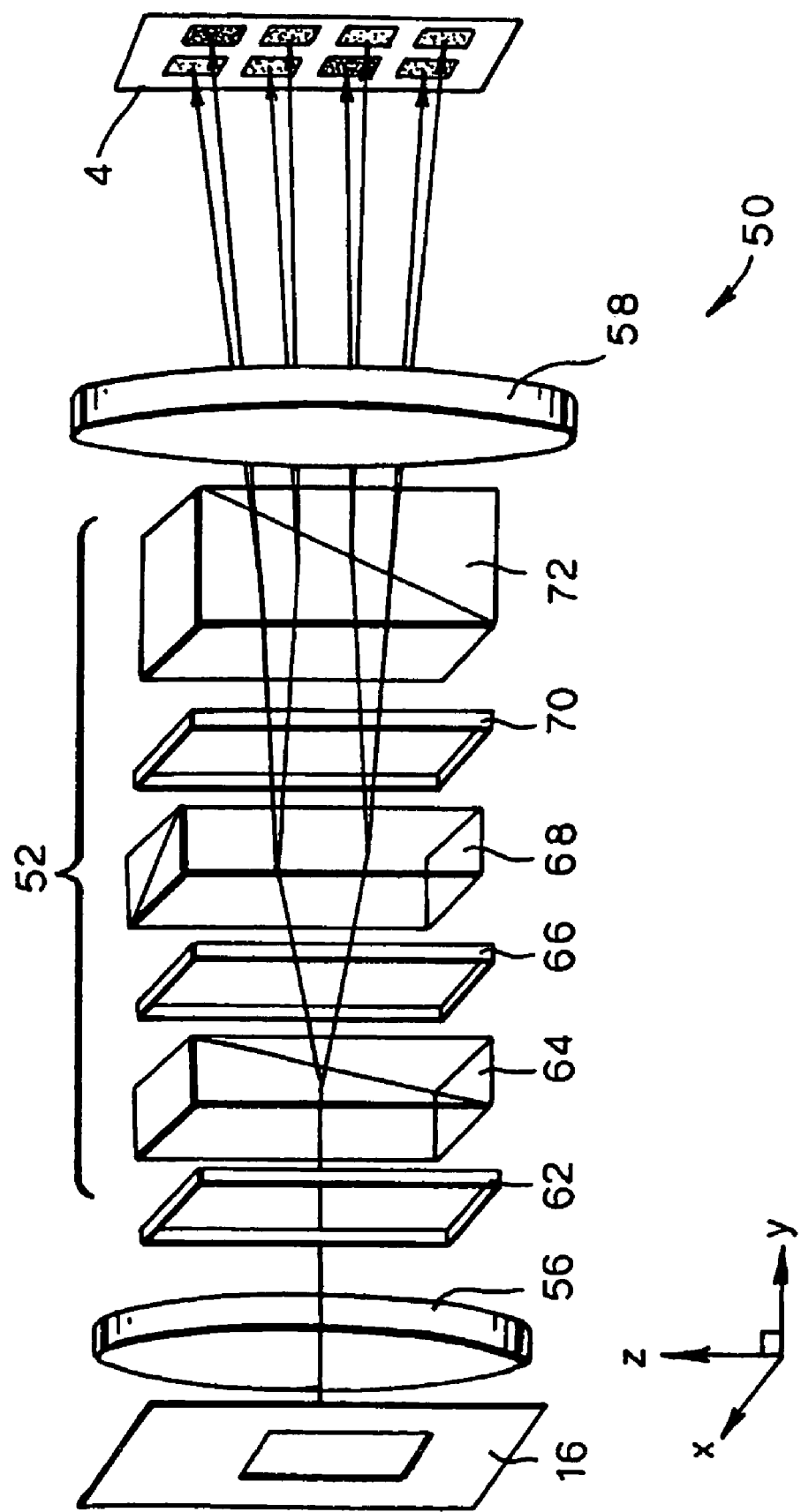
Figure 3:
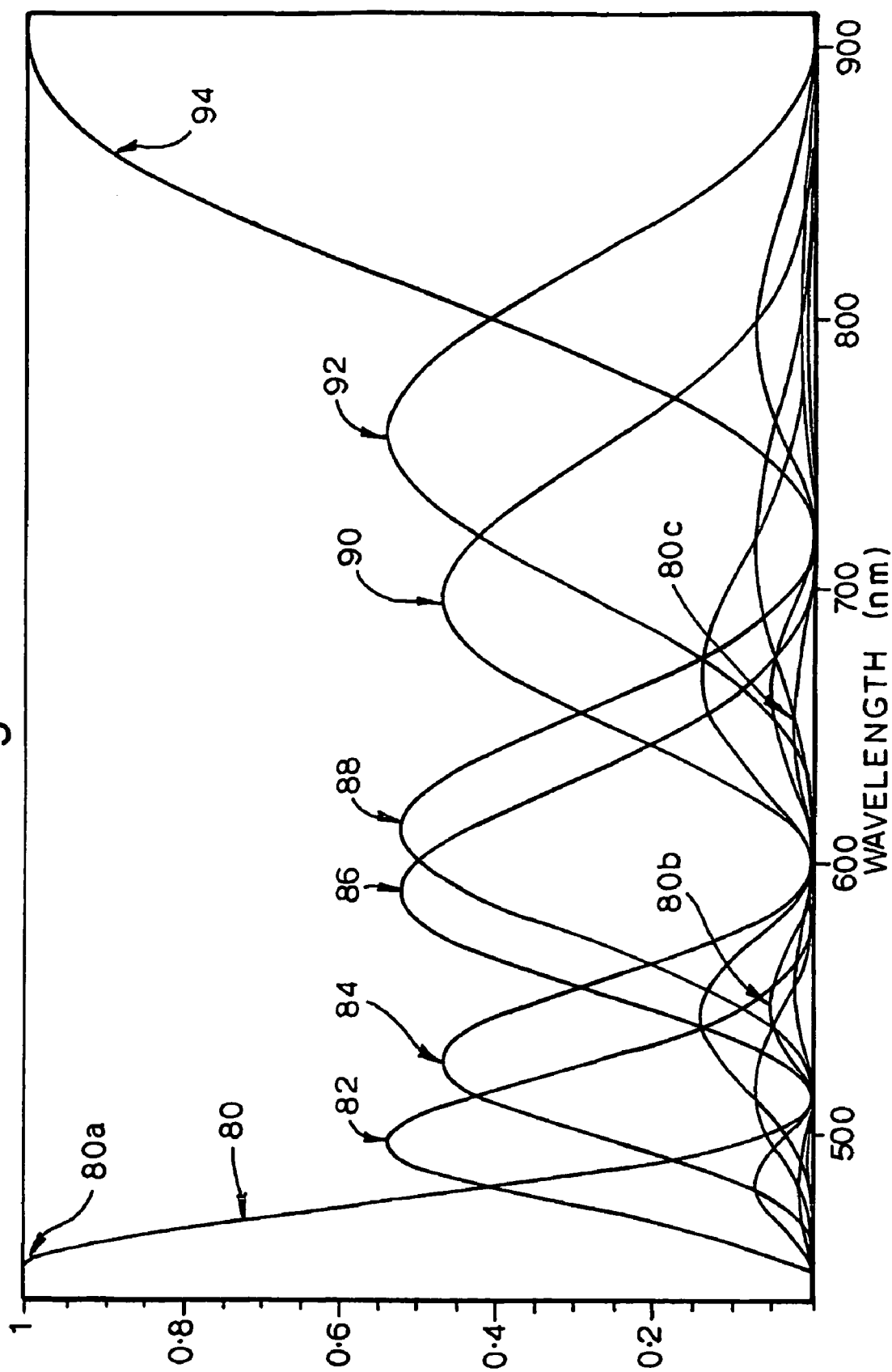
Figure 4:
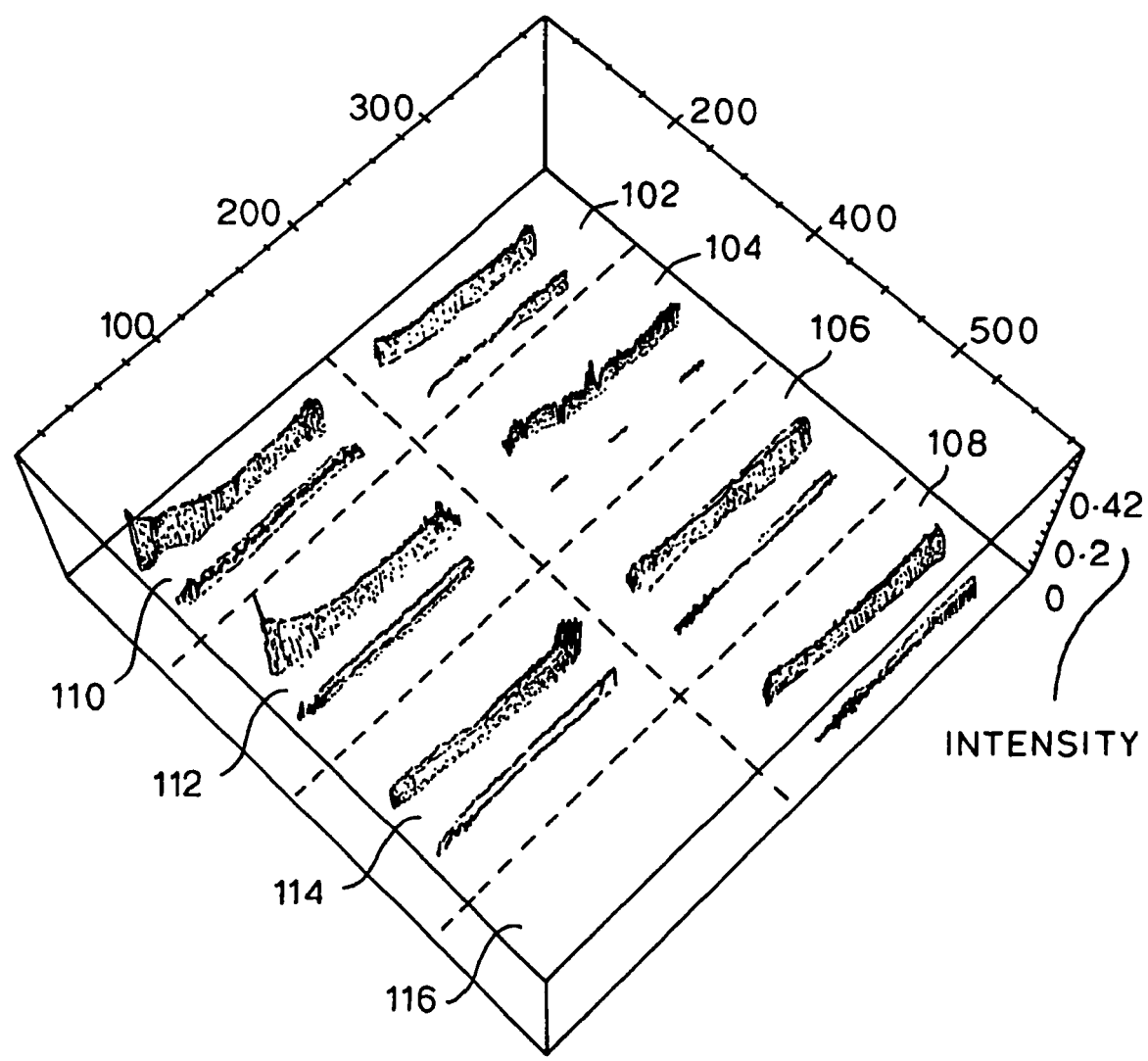

The invention will now be described, by way of example only, with reference to the following drawings in which;

FIG. 1 illustrates an imaging spectrometer according to the present invention, FIG. 2 illustrates an alternative imaging spectrometer according to the present invention, FIG. 3 illustrates the transmission function of an eight channel imaging spectrometer of the type illustrated in FIG. 2, FIG. 4 shows spectral image intensity data acquired using a spectrometer according to the present invention, and FIG. 5 shows a plot of the integrated intensity of the acquired spectral image of FIG. 4.

Referring to FIG. 1, an imaging spectrometer 2 according to the present is shown. The imaging spectrometer 2 comprises a detector 4, a first lens 6, a filter array 8, a second lens 10, image replication optics 12, an input lens 14 and a field stop 16. The image replication optics 12 comprises a first Wollaston prism 18, a second Wollaston prism 20, a third Wollaston prism 22, a first retarder 24 and a second retarder 26.

In operation light from a scene is directed by the input lens 14 to the first Wollaston prism 18 of the image replication optics 12. The first Wollaston prism 18 acts as a polarising beam splitter and splits the light into two diverging, orthogonally polarised, output rays. The first retarder 24 couples the output linear polarisation states from the first Wollaston prism 18 into circular or slant (elliptical) polarisation states. Each of the two slant polarisation light beams are then divided by the second Wollaston prism 20 thus giving four rays. These four rays are then passed through the second retarder 26 and split in to eight diverging rays by the third Wollaston prism 22.

The fast axes of the first retarder 24 and the second retarder 26 are typically set at around 45° to the vertical (i.e. z) axis. In other words, the retarders are configured so as to rotate the horizontally and vertically polarised light beams emitted by one Wollaston prism into circularly polarised light or into light that is approximately linearly polarised at 45°. This enables the next Wollaston prism in the series to further split each circularly or linearly polarised light beam into diverging horizontally polarised and vertically polarised light beams. The retarders may, for example, be either quarter-wave plates or half-wave plates.

The eight separate images produced by the image replication optics 12 are focussed onto the detector 4 by the second lens 10 and the first lens 6. The filter array 8 comprises eight dichroic filter elements, each having a different spectral response, that are located at an intermediate focal plane. The filter elements may be broad-band, narrow-band, contiguous or non-contiguous. Each of the eight replicated images passes a separate element of the filter array 8, thereby producing eight spectral images that are spatially separated on the detector 4. A skilled person would appreciate the filter array 8 may also be placed in the detector plane.

The detector 4 may be a single detector array, for example a CCD detector, or may comprise multiple adjacent detectors.

The form of the detector 4 will depend on the spatial resolution required from the system, and as the number of replicated spectral images is increased the number of pixels per image for a given detector will obviously be reduced accordingly. CCD detectors are currently known that have up to 4096× 4096 pixels. For high data rates, the use of several detector arrays may be preferred as they will typically provide a greater space-bandwidth product than a single detector array.

The number of detector pixels used in an imaging spectrometer of the present invention can, in principle, be equal to the number of pixels in the detector array. This is compared to around 30% efficiency for prior art computed tomographic imaging spectrometry. However, in practice, the requirement to separate images at the detector may mean that it is preferable to use a small border round each image.

As the eight spectral images are spatially separated across the detector, it is preferable that a co-registration of each spectral image is performed. In other words, it has to be determined which areas of each of the eight spectral images formed on the detector correspond to a particular area of the imaged scene. This enables the spectral properties of each part of the scene to be compared. This co-registration, or calibration, process is most readily addressed at the time of manufacture.

Although the embodiment described above provides eight spectral images, a person skilled in the art would recognise that a system with N Wollaston prisms and N−1 retarders will produce $2^N$ replicated images at the detector. The number of spectral images produced is dependent only upon the number of Wollaston prisms in the chain. If a device with greater spectral resolution is required, more prisms can be added to the device. The prisms and retarders may be cemented to one another to form a single, and mechanically robust, optical element; such a single optical element would have greatly reduce optical losses arising from Fresnel reflections.

A person skilled in the art would also recognise that the spectrometer described with reference to FIG. 1 could also be employed to measure polarisation dependent properties of light. For example, instead of recording eight spectral channels, it is possible to record four spectral images having horizontal linear polarisation and four spectral images having vertical linear polarisation.

It is also possible to record full Stokes parameter polarisation information using imaging spectrometers of the type described with reference to FIG. 1. If non-multiplexed measurements were required a non-polarising beam splitter could be used to couple light from a scene into two imaging spectrometers with the polarisation state of the light entering one of the spectrometers being altered, for example by the use of a retarder. Alternatively, if multiplexed operation is acceptable, two sets of spectral images could be acquired using a single imaging spectrometer that has a variable polarisation selecting device. An input retarder (not shown) that is moveable between two different orientations could be used as such a variable polarisation selecting device. With calibration, this would enable fully characterised polarimetric information to be recorded.

Referring to FIG. 2, an alternative imaging spectrometer 50 according to the present invention is shown. Components of the spectrometer 50 that are common with components described in FIG. 1 are assigned like reference numerals. The spectrometer 50 comprises a field stop 16, a first lens 56, image replication optics 52, a second lens 58 and a detector 4. The replicating optics 52 comprise a first retarder 62, a first Wollaston prism 64, a second retarder 66, a second Wollaston prism 68, a third retarder 70 and a third Wollaston prism 72.

The spectral filtering properties of the spectrometer 50 arise because the retarders 62, 66 and 70 are specifically designed (see below) so that they impart a wavelength dependent change to the polarisation state of any light they receive.

As a result, when the Wollaston prisms separate light into diverging orthogonal polarisation components the two diverging components are comprised of light with different spectral properties. The retarders, in combination with the Wollaston prisms, thus provide spatial separation of difference wavelengths of light. In other words, the retarders and Wollaston prism of the replicating optics are configured to use the wavelength dependence of the retarders in combination with the polarisation analysing function of the Wollaston prisms to spectrally filter each replicated image according to its propagation route through the device. This filtering technique is more efficient than producing a number of white light images that are passed through dichroic filter elements.

As described with reference to FIG. 1 above, the Wollaston prisms provide diverging output rays. The replicated images produced by replicating optics 52 are thus spatially separated when they reach the detector 4. The imaging spectrometer 52 therefore enables different spectral transmission functions to be applied to each replicated image with minimal rejection of light; an overall optical efficiency approaching 100% can thus be obtained.

The wavelength filtering properties of the replicating optics can be demonstrated by considering a ray entering the system. The first retarder 62, the fast axes of which is aligned at 45° to the vertical, will introduce a phase difference between the component of the input wave polarised parallel to its fast axis and the orthogonally polarised component. This phase difference is:

$$\Delta\phi = (n_e d - n_o d) \times 2\pi/\lambda \tag{1}$$

where d is the thickness of the retarder, $n_e$ is the extraordinary refractive index of the retarder, $n_o$ is the ordinary refractive index of the retarder and λ is the wavelength of the light.

The two orthogonally polarised components produced by the first retarder add to produce a ray that varies between being co-polarised to the input polarisation for $2n\pi$ phase difference through degrees of elliptical polarisation to orthogonal linear polarisation for a phase difference of $(2n+1)\pi$. The polarisation state of the wave leaving the first retarder is thus dependant upon the wavelength.

The first Wollaston prism analyses the ray it receives from the first retarder into two diverging orthogonal, linearly polarised with relative intensities of $\cos^2(\Delta\phi)$ and $\sin^2(\Delta\phi)$. It can thus be seen that apparatus with three retarder-prism pairs would produce eight images with spectral transmission functions that are due to combinations of the pairs of transmissions functions given above. In other words, the eight replicated images would each have transmission properties that are governed by the following equations:

$$\cos^2\left[2d_1\pi\left(\frac{n_e-n_o}{\lambda}\right)\right]\cos^2\left[2d_2\pi\left(\frac{n_e-n_o}{\lambda}\right)\right]\cos^2\left[2d_3\pi\left(\frac{n_e-n_o}{\lambda}\right)\right] \tag{2a}$$

$$\cos^2\left[2d_1\pi\left(\frac{n_e-n_o}{\lambda}\right)\right]\cos^2\left[2d_2\pi\left(\frac{n_e-n_o}{\lambda}\right)\right]\sin^2\left[2d_3\pi\left(\frac{n_e-n_o}{\lambda}\right)\right] \tag{2b}$$

$$\cos^2\left[2d_1\pi\left(\frac{n_e-n_o}{\lambda}\right)\right]\sin^2\left[2d_2\pi\left(\frac{n_e-n_o}{\lambda}\right)\right]\cos^2\left[2d_3\pi\left(\frac{n_e-n_o}{\lambda}\right)\right] \tag{2c}$$

$$\cos^2\left[2d_1\pi\left(\frac{n_e-n_o}{\lambda}\right)\right]\sin^2\left[2d_2\pi\left(\frac{n_e-n_o}{\lambda}\right)\right]\sin^2\left[2d_3\pi\left(\frac{n_e-n_o}{\lambda}\right)\right] \tag{2d}$$

$$\sin^2\left[2d_1\pi\left(\frac{n_e-n_o}{\lambda}\right)\right]\cos^2\left[2d_2\pi\left(\frac{n_e-n_o}{\lambda}\right)\right]\cos^2\left[2d_3\pi\left(\frac{n_e-n_o}{\lambda}\right)\right] \tag{2e}$$

$$\sin^2\left[2d_1\pi\left(\frac{n_e-n_o}{\lambda}\right)\right]\cos^2\left[2d_2\pi\left(\frac{n_e-n_o}{\lambda}\right)\right]\sin^2\left[2d_3\pi\left(\frac{n_e-n_o}{\lambda}\right)\right] \tag{2f}$$

$$\sin^2\left[2d_1\pi\left(\frac{n_e-n_o}{\lambda}\right)\right]\sin^2\left[2d_2\pi\left(\frac{n_e-n_o}{\lambda}\right)\right]\cos^2\left[2d_3\pi\left(\frac{n_e-n_o}{\lambda}\right)\right] \tag{2g}$$

$$\sin^2\left[2d_1\pi\left(\frac{n_e-n_o}{\lambda}\right)\right]\sin^2\left[2d_2\pi\left(\frac{n_e-n_o}{\lambda}\right)\right]\sin^2\left[2d_3\pi\left(\frac{n_e-n_o}{\lambda}\right)\right] \quad (2h)$$

Referring to FIG. 3, the calculated wavelength dependent transmission properties of replicating optics of the type described with reference to FIG. 2 are shown. The first retarder is taken to be 1.5 µm thick, the second retarder is 3 µm thick and the third retarder is 6 µm thick. The extraordinary refractive index of each retarder is 1.65, and the ordinary refractive index of each retarder is 1.5. The first curve 80, second curve 82, third curve 84, fourth curve 86, fifth curve 88, sixth curve 90, seventh curve 92 and eighth curve 94 correspond to the transmission functions of equations (2a), (2b), (2c), (2d), (2e), (2f), (2g) and (2h) respectively.

It can be seen from FIG. 3 that the transmission curves are approximately bell-shaped. This may slightly complicate the measurement of continuum spectra, but is an advantage for accurately locating line spectra, where the relative signal in adjacent channels could be used to accurately calculate the central wavelength.

Furthermore, each transmission curve has a main peak (eg 80*a*) and a few smaller subsidiary peaks (e.g. 80*b,c*). The subsidiary peaks could be removed by the use of filters if required. Numerical optimisation techniques known to those skilled in the art, such as direct search, simulated annealing etc could also be employed to tailor the filter functions.

The above analysis shows that the wavelength characteristics of the replicating optics can be controlled by selecting retarders of an appropriate thickness. This approach provides a simple technique for optimising the response of the replicating optics. However, a person skilled in the art would recognise that other properties of the replicating optics could be adjusted to optimise system performance. For example, the dispersion of the wave-plates could be chosen so as to tune and optimise spectral responses. Multi-layer wave-plates or additional optics could also be used. The interdependent nature of each of the optical elements would, however, have to be considered when designing a system to provide a certain spectral response.

A person skilled in the art would recognise that although three pairs of Wollaston prisms and retarders are described in the example described with reference to FIGS. 2 and 3, this would in no way be seen as limiting the scope of the invention. In general terms, a skilled person would appreciate that a sequence of N Wollaston prisms and N retarders could be used to produce $2^N$ replicated images at the detector array. The prisms and retarders may be cemented to one another to form a single, and mechanically robust, optical element; such a single optical element would have greatly reduced optical losses arising from Fresnel reflections.

Imaging spectrometers of the present invention can be provided that operate at any wavelength for which birefringent materials exist; this covers from around 200 nm to beyond 14 µm. For example, low-cost magnesium fluoride enables coverage from about 200 nm to longer than 5 µm. Quartz, calcite, and rutile also provide wide spectral coverage within this range. For the long-wave infrared, tellurium may be used, although the poor mechanical properties of this material can make its use problematic.

Referring to FIG. 4, experimental data acquired using an imaging spectrometer of the type described with reference to FIG. 1 is shown. The imaging spectrometer was used to image two blades of grass: one freshly picked and the other picked the day before. The eight spectral images 102, 104, 106, 108, 110, 112, 114, 116 were filtered by dichroic filter elements with peak wavelength responses centred around 450 nm, 488 nm, 500 nm, 530 nm, 550 nm, 600 nm, 633 nm and 656 nm respectively.

Referring to FIG. 5 calibrated albedo spectra from two locations in the scene of FIG. 4 are shown. Curve 120 corresponds to the wavelength dependent transmission properties of the 'old' grass whilst curve 122 corresponds to the wavelength dependent properties of the freshly picked stalk of grass. Curve 124 represents the 'standard' reflectance spectrum taken from a spectral data base. It can be seen that the recently picked grass has a reflectance spectrum that closely resembles the 'standard' reflectance spectrum taken from a spectral data base whereas the 'old' leaf has a significantly different spectrum.

An imaging spectrometer according to the present invention thus enables snap-shot spectral imaging with higher signal-to-noise ratios than prior art devices. The instrument has no moving parts and can be very compact, rugged and lightweight. Applications of imaging spectrometers according to this invention are likely to be found in all areas where real-time operation is important, such as military surveillance from moving platforms and medical imaging.

The invention claimed is:

1. An imaging spectrometer comprising;
   an imager for dividing a received image into four or more spatially separated spectral images, and
   detector apparatus for detecting each spectral image,
   wherein the imager comprises at least three image replication stages in optical series, each comprising a Wollaston prism and wherein light forming each spectral image passes through the Wollaston prism of each replication stage.

2. A spectrometer according to claim 1 wherein the imager comprises one or more filter elements which act to alter the spectral characteristics of one or more of the spatially separated images.

3. A spectrometer according to claim 2 wherein the one or more filter elements are dichroic filter elements.

4. A spectrometer according to claim 2 wherein the one or more filter elements are located in the vicinity of said detector apparatus or a conjugate plane thereof.

5. A spectrometer according to claim 2 additionally comprising optical retardation elements located between Wollaston prisms of adjacent image replication stages.

6. A spectrometer according to claim 2 wherein the imager further comprises an input optical retardation element to define the input polarization state of the image received by a first image replication stage and wherein optical retardation imparted by the input optical retardation element is variable.

7. A spectrometer according to claim 5 wherein at least on of the optical retardation elements has substantially wavelength independent retardation properties.

8. A spectrometer according to claim 1 wherein each image replication stage comprises an optical retardation element and a Wollaston prism.

9. A spectrometer according to claim 8 wherein one or more of the optical retardation elements provides a wavelength dependent polarisation change.

10. A spectrometer according to claim 8 wherein the thickness of the one or more optical retardation elements is chosen to define the spectral properties of each spectral image.

11. A spectrometer according to claim 1 wherein each spectral image is composed of radiation within a different waveband.

12. A spectrometer according to claim 1 wherein the detector apparatus comprises a detector array, each replicated image being directed to a separate portion of the detector array.

13. A spectrometer according to claim 1 wherein the detector apparatus comprises two or more detector arrays.

14. A spectrometer according to claim 13 wherein a separate detector array is provided to detect each replicated image.

15. A spectrometer according to claim 1 wherein the optical components of the imager are formed as a single compound optical element.

16. A spectrometer according to claim 1 and additionally comprising a field stop, the field stop limiting the field of the image received by the imager.

17. An imaging spectrometer comprising;
imaging means for dividing a received image into four or more spatially separated spectral images, and
means for detecting each spectral image,
wherein the imaging means comprises at least three image replication stages in optical series, each comprising a Wollaston prism, and wherein light forming each spectral image passes through the Wollaston prism of each image replication stage.

* * * * *

UNITED STATES PATENT AND TRADEMARK OFFICE
CERTIFICATE OF CORRECTION

PATENT NO. : 7,649,626 B2 Page 1 of 1
APPLICATION NO. : 10/511502
DATED : January 19, 2010
INVENTOR(S) : Harvey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 634 days.

Signed and Sealed this

Twenty-third Day of November, 2010

David J. Kappos
*Director of the United States Patent and Trademark Office*